US012529462B1

(12) United States Patent
Massey et al.

(10) Patent No.: US 12,529,462 B1
(45) Date of Patent: Jan. 20, 2026

(54) BEAM SHAPING-COLLECTOR SYSTEMS AND METHODS

(71) Applicant: VALEO VISION, Bobigny (FR)

(72) Inventors: Andrew Massey, Seymour, IN (US); Brant Potter, Seymour, IN (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/959,783

(22) Filed: Nov. 26, 2024

(51) Int. Cl.
*F21S 41/43* (2018.01)
*F21S 41/25* (2018.01)
*F21S 41/32* (2018.01)
*F21W 102/155* (2018.01)

(52) U.S. Cl.
CPC ............... *F21S 41/43* (2018.01); *F21S 41/25* (2018.01); *F21S 41/323* (2018.01); *F21W 2102/155* (2018.01)

(58) Field of Classification Search
CPC ......... F21S 41/25–275; F21S 41/30–47; F21S 41/67–698; F21W 2102/10–19
See application file for complete search history.

(56) References Cited

U.S. PATENT DOCUMENTS

| 10,215,357 | B2 * | 2/2019 | Watanabe | F21S 43/195 |
| 10,634,302 | B2 * | 4/2020 | Yamamoto | F21S 41/147 |
| 11,280,464 | B2 | 3/2022 | Giraud | |

* cited by examiner

*Primary Examiner* — Jason M Han
(74) *Attorney, Agent, or Firm* — Valeo Vision

(57) ABSTRACT

The present invention pertains to an automotive lighting system arrangement including an optical light module with a light source that produces light rays and emits light rays along the module's optical axis towards a beam clipping structural arrangement that forms a cutoff in a generated light beam; the reflective collector being arranged with a trim shield and an optional light blocker so that a portion of the light rays directed along the optical axis has a pre-designed shape or angle of inclination relative to a benchmark axis, such that the optical light module forms a shaped image from the interaction of light rays across a collector's reflective surface with the trim shield to achieve the shaped image of the cutoff beam. The invention also describes application to lighting systems that include multiple associated lighting device modules.

19 Claims, 12 Drawing Sheets

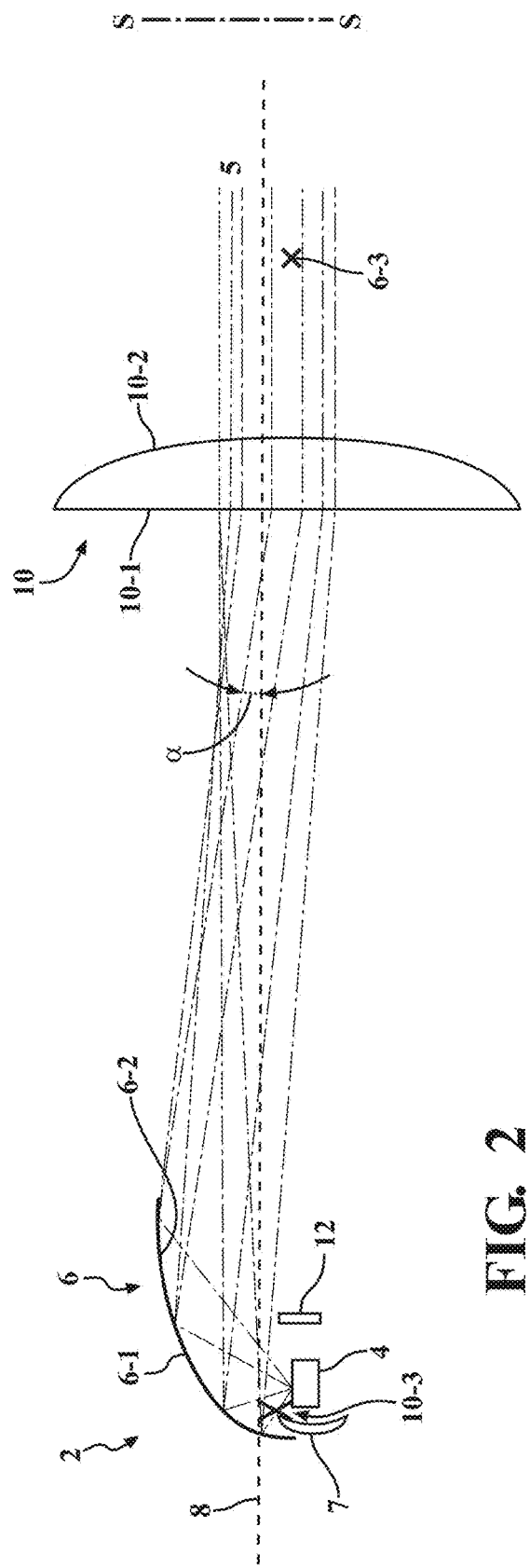

BEAM SHAPING-COLLECTOR SYSTEMS AND METHODS

TECHNICAL FIELD

The present invention relates to a lighting module for automobiles, and more particularly to an optical system derived from the lighting module that applies a light collector arrangement with an intermediate shield to project a tailored light beam.

BACKGROUND OF THE INVENTION

The invention relates to the lighting field and more particularly to the field of automotive lighting and signaling devices. As it is generally known practice to produce a lighting beam with cutoff using multiple light modules with a "bender." A "bender" is generally known to mean an optical device within a lighting module, such as a mirror that is capable of changing the direction of a light beam or being applied to repoint the beam in compact beam lighting systems. This commonly referenced term "bender" derives its meaning given that a reflective surface can "bend" beams in any designated direction. For example, a reflective surface can be made to "bend" beams towards the top of a projection lens whose light rays would otherwise form an upper portion of the produced light beam. However, such produced beams have the drawback of requiring high-precision in the positioning of the bender and the cutoff edge. When placing the cutoff edge between the "bender" and the lens, this circumstance would require that the projection lens becomes thicker because of its small focal length, which would typically increase the weight and complication of producing such lighting devices with associated lighting systems.

Therefore, an objective is to mitigate at least one of the drawbacks from the known challenges in the current field and to distinguish an inventive approach apart from the prior art. Another objective is to produce light modules capable of forming light beams with alternative design beam cutoffs. More particularly, an object of the invention is to provide a light module with designed beam cutoff capable of forming a desirably shaped light beam that is compact and more economical to produce.

SUMMARY OF THE INVENTION

The present invention is directed towards solutions that address at least one or more of the described issues or problems described herein. It is believed that the present invention provides a unique system design for light shape control of an optical light module that include a lens arrangement to work efficiently and as mandated by providing a beam output that is conforming and proper. Particularly, the present invention provides beam shape control features for producing light beams without introducing irregularities in resulting beam patterns in an optical light module. It is contemplated that these arrangements can be disposed inside an optical light module or an associated system and be tailored for such purposeful use.

These and other objectives of the disclosure may be achieved by one or more of the following aspects. Accordingly, the present invention proposes a non-limiting embodiment of the present invention, there is provided a light module of an automobile comprising: a light source configured to generate a beam image; a collector with a reflective surface configured to capture the light from the light source and redirect a number of light rays towards a focal point located along a trim shield, the number of light rays configured to propagate in a direction along an optical axis of the light module; the trim shield located between the light source and the collector and adapted to formulate a beam projection image; the trim shield having a feature that modifies or shapes the beam image originating from the light source into the beam projection image and then into a shaped beam at a projection surface.

Accordingly, pursuant to a first aspect of the present invention, there is contemplated a light module of an automobile comprising: a light source configured to generates light rays; a trim shield having at least a feature that shapes a number of the light rays to produce a beam pattern, with the trim shield located between the light source and a collector; and the collector with a reflective surface profile configured to redirect the beam pattern in a direction along an optical axis of the light module.

A non-limiting preceding embodiment wherein the feature of the trim shield produces a cutoff effect onto the beam pattern that propagates to a projection surface [S].

A non-limiting preceding embodiment further including a projection lens wherein the collector is configured to redirect the beam pattern in the direction along the optical axis towards a projection lens.

A non-limiting preceding embodiment further including a projection lens with a light input side and a light output side that receives a portion of the number of light rays from the collector after light traverses the trim shield and a light blocker.

A non-limiting preceding embodiment wherein the collector has an elliptical or ellipsoid form surface impression.

A non-limiting preceding embodiment wherein the collector has a parabolic form surface impression.

A non-limiting preceding embodiment wherein the beam cutoff feature is an extension from the trim shield.

A non-limiting preceding embodiment wherein the beam cutoff feature is an impression or a protuberance formed within the trim shield.

A non-limiting preceding embodiment wherein the extension forms a profile edge configured to interfere with light from the light source and reshape the beam pattern from an alteration through the beam cutoff feature.

A non-limiting preceding embodiment wherein the impression or the protuberance is configured to interfere with light from the light source and reshape the beam pattern with a cutoff effect through the beam cutoff feature.

A non-limiting preceding embodiment wherein the trim shield further includes a first lateral edge and a second lateral edge applied with beam cutoff feature.

A non-limiting preceding embodiment wherein the projection lens is a thin lens and formed integral as one-piece with at least one collector associated with the light module.

A non-limiting preceding embodiment wherein the projection lens is a light transmissive medium or an imaging mirror within the light module.

A non-limiting preceding embodiment wherein the collector encompasses the light source by a half-space shell.

A non-limiting preceding embodiment wherein a profile of the trim shield includes a structure of a number of adjoining surfaces that are curvilinear, free-form, segmented, revolved, swept, asymmetric or some combination thereof.

A non-limiting preceding embodiment where a partition is provided between the light module and an adjacent light module;

the partition being light absorbent so as to prevent light rays from escaping from each light module and interfering with each beam between the light module and the adjacent light module.

A non-limiting preceding embodiment wherein the trim shield is formed from a polycarbonate (PC), polyetherimide (PEI), metallic or other polymeric material.

A non-limiting preceding embodiment wherein the number of light rays from the light source are configured to be located along the trim shield before the number of light rays arrive at the collector.

Accordingly pursuant to an alternate aspect of the present invention, there iscontemplated a beam shaping light module of an automotive product comprising: a light source configured to generate a beam pattern; a trim shield located between the light source and a collector, the collector having a reflective surface profile configured to redirect light in a direction along an optical axis of the light module; wherein the trim shield has a cutoff feature that shapes the beam pattern emitted by the light source; the cutoff feature of the trim shield configured to reshape the beam image with a cutoff effect; and the cutoff effect extended to a projection lens having a light input side and a light output side resulting in a cutoff beam pattern onto a projection surface [S].

Accordingly pursuant to an alternate aspect of the present invention, there is contemplated beam shaping light module of an automotive product comprising: a light source configured to generate a beam pattern; a trim shield located between the light source and a collector, the collector having a reflective surface profile configured to redirect light in a direction along an optical axis of the light module; wherein the trim shield has a cutoff feature that shapes the beam pattern emitted by the light source; the cutoff feature of the trim shield configured to reshape the beam image with a cutoff effect; and the cutoff effect extended to a secondary reflector resulting in a cutoff beam pattern onto a projection surface [S].

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

Variations and modifications can be made to the aforementioned structure without departing from the concepts of the present invention. And it should be appreciated that the above referenced embodiments and examples are non-limiting, as other embodiment variations can exist within the present invention, as shown and described herein. Moreover, such concepts are intended to be covered by the following claims unless these claims by their language expressly state otherwise.

BRIEF DESCRIPTION OF DRAWINGS

To complete the description and to provide a better understanding of the invention, a set of drawings is provided. Said drawings form an integral part of the description and illustrate various embodiments of the invention, which should not be construed as restricting the scope of the invention, but only as an example of how the invention can be practiced. The drawings comprise the following characteristics.

FIG. 2 is a principal view representation of an exemplary light module trim shield arrangement of the present invention in a baseline embodiment.

FIG. 3 is a graphical representation of the resulting beam pattern produced by the light module of FIG. 2.

DETAILED DESCRIPTION OF THE INVENTION

Hereinafter, embodiments of the present invention will be described with reference to the accompanying drawings.

Figure 1A:
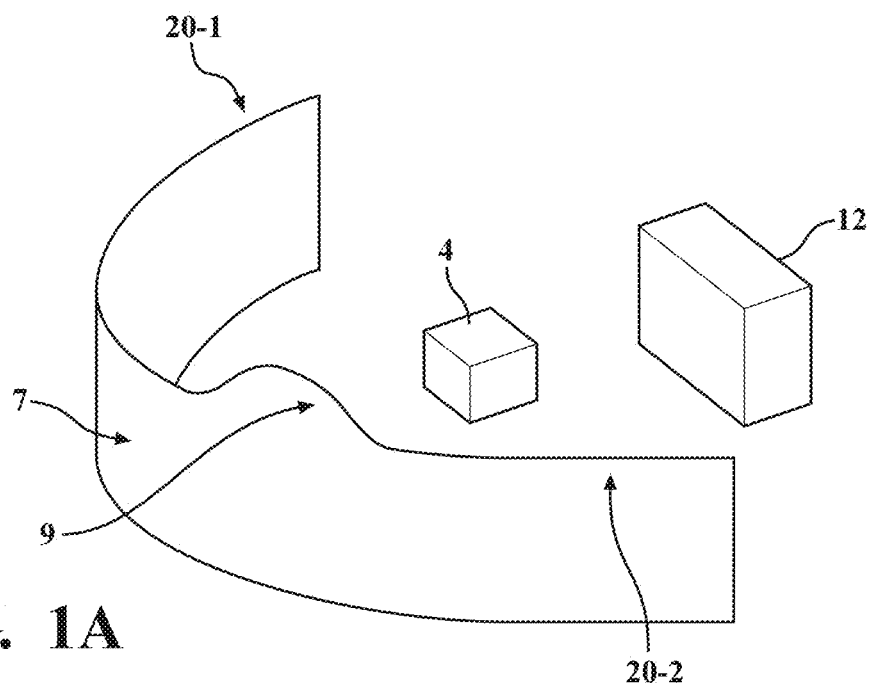
FIG. 1A illustrates a detail view of essential elements to formulate shape control of a light beam by application of a trim shield upstream of the collector.
Figure 1B:
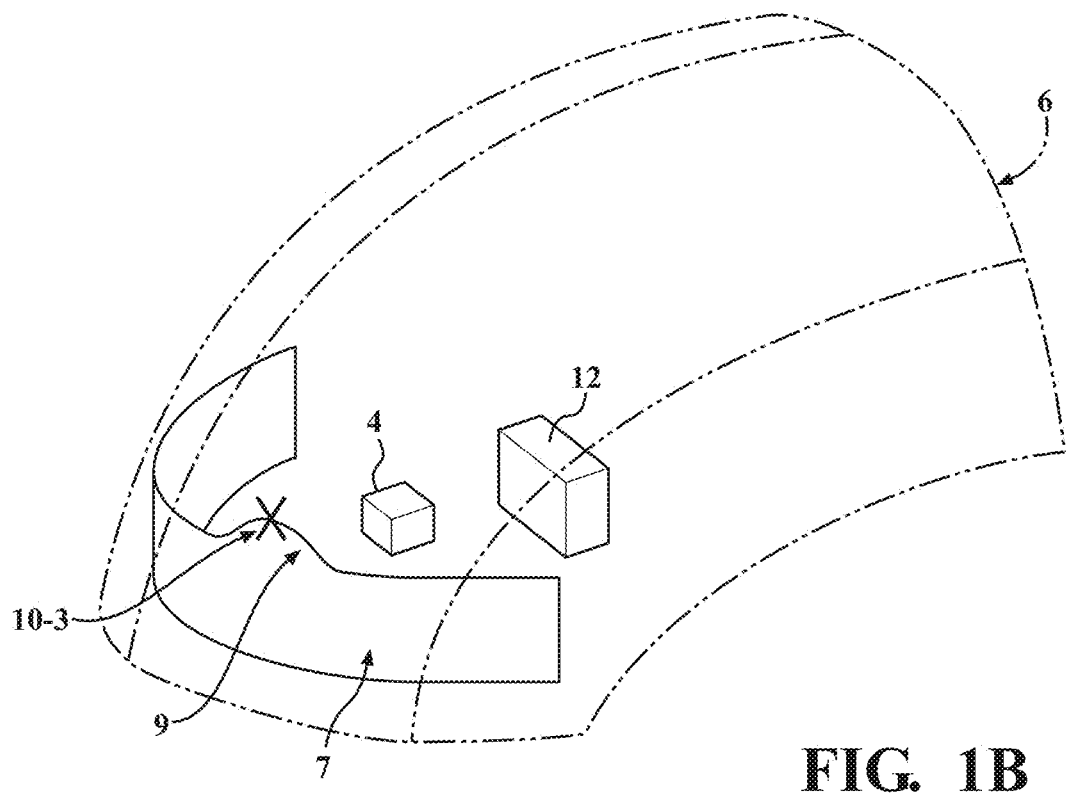
FIG. 1B illustrates a detail view of a material arrangement to formulate shape control of a light beam using a trim shield upstream and encompassed by the reflective-collector.

FIG. 1A illustrates an isometric view and details the essential elements involved in the beam control approach with light source 4, trim shield 7 features and light blocker 12. FIG. 1B depicts a perspective from the trim shield 7 that can include beam cutoff feature 9, upper lateral edge 20-1, upper lateral edge 20-2 with light blocker 12 elements that is applied with light source 4 that further illustrate the prospective constituents for the illustratively described "Trim Shield" shaping control approach from FIG. 1A. A first upper lateral edge 20-1 and a second upper lateral edge 20-2 can contribute towards intersection with beam cutoff feature 9 and furthers control shaping of beam 30 to result in beam cutoff effect 40.

FIG. 1B illustrates an alternative detail view of the beam control approach that can apply trim shield 7 with beam cutoff features 9, 20-1, 20-2 with light blocker 12 and light source 4, which is encompassed by the reflective collector 6.

FIG. 2 represents an exemplary light module arrangement that can be associated with the optical light module 2 to promote the lighting device's operation. The light module 2 can project a shaped beam 40 after application of trim shield 7 or an optional light blocker 12, a light source 4 and a collector 6 capable of reflecting the emitted light rays 5 from light source 4 in order to form a beam cutoff effect 40 along an optical axis 8 of the module 2, and through a lens 10 with focal point 10-3, to facilitate projection of the resulting beam cutoff effect 40 onto a projection surface S.

Optical projection systems other than the applied lens 10 for projection are envisioned that can include various embodiments, such as the embodiments depicted in the figures, by non-limiting example. The light source 4 can include a semiconductor light source or light emitting diode (LED) that emits light rays 5 in a half-space delimited by the main plane of the light source. In the example shown, the light source 4 emits light 5 in a main direction that is perpendicular to the main plane and to the optical axis 8. According to the invention, the main direction of emission 5 can capably be between 65° and 115° with respect to the optical axis 8.

The material parts of the collector 6 can include a shell or cap shape structure 6-1 and a reflective surface 6-2 along an inner face of the collector structure 6 with a focal point at the light source 4. The reflective surface 6-2 can have an elliptical or parabolic-type profile. The reflective surface 6-2 can be a surface of revolution about an axis parallel to the optical axis 8. Alternatively, the surface of the collector 6 can be a free-form surface, a swept surface or an asymmetric surface. The surface of the collector 6 can also include a plurality of segments.

Likewise the material parts of the trim shield 7 profile structure can include a curvilinear, free-form, revolution, segmented, swept or asymmetric structure of adjoining surfaces. The trim shield's associated surfaces can be reflective, light-absorptive or partially characteristic of both reflective or light absorptive portions. The shell or cap-shaped reflective collector 6 and trim shield 7 can be made from materials exhibiting good heat resistance, e.g. glass or of synthetic polymers such as polycarbonate (PC) or polyetherimide (PEI) by non-limiting examples. The expression "parabolic type" generally applies to reflectors whose surface has a single focal point, i.e. one region of convergence of the light rays, i.e. one region such that the light rays emitted by a light source placed in this region of convergence are projected to a great distance after reflection from the surface.

"Projected to a great distance" means that the emitted light rays do not converge toward a region located at least 10 times the dimensions of the reflector. In other words, the reflected rays do not converge toward a region of convergence. Or if the reflected rays do converge, this region of convergence is located at a distance greater than or equal to 10 times the dimensions of the reflector. A parabolic surface may therefore feature or not feature parabolic segments. A reflector with such a surface can be generally used alone to create a light beam. Alternatively, it may be used as projecting surface associated with an elliptical-type reflector. In this case, the light source of the parabolic-type reflector can be the region of convergence of the rays reflected by the elliptical-type reflector. The projection lens 10 can be a plano-convex lens—in other words having a planar entrance face 10-1 and a convex exit face 10-2.

Projection lens 10 can be referenced as "thin," for example as less than 6 mm due to the low inclination of the rays to be deflected. Projection lens 10 has a focal point 10-3, which can be located along the optical axis 8 at the level of the light source 4 or behind the light source 4. In this case, the focal point 10-3 can be located on trim shield 7 or near the level of the reflective surface 6-2 of the collector 6. It should be noted that it also can be possible for this focal point 10-3 to be located behind or in front of trim shield 7 provided that the focal point 10-3 is in proximity, and preferably within less than 10 mm, and preferably less than 5 mm, thereto.

The reflective surface 6-2 can have a second focal point 6-3 located in front of projection lens 10 and at a distance offset from the optical axis 8, if it is of elliptical type. It should be noted that it is also possible for focal point 6-3 to be located behind the projection lens 10 or on the optical axis 8, provided that the focal point 6-3 is in proximity to projection lens 10, so as to decrease the width of the beam on the entrance face 10-1 of the projection lens 10.

The light module 2 can include a light blocker 12 arranged in front of the light source 4 and facing the reflective surface 6-2 of the collector 6 so to collect the light rays 5 emitted by the light source 4 in question, which do not encounter the reflective surface 6-2. Applying the measure of light blocker 12 is useful for avoiding the presence of parasitic light rays or visible defects that can disrupt or contribute in the formation of the light beam—the measure of applying light blocker 12 avoids the parasitic light rays without being imaged into the beam. The effect of the mentioned parasitic light rays will then potentially light an upper portion of the light beam, which is not desirable in the case of lighting beams with a cutoff. The light blocker 12 can be advantageously opaque in order to absorb these mentioned parasitic rays—it being understood that it's also possible to envisage reflecting the parasitic rays away towards a distal absorption region.

FIG. 3 is a graphical representation of the resulting beam pattern produced by the light module 2 from FIG. 2. The horizontal axis and the vertical axis cross on the optical axis 8 of the light module 2. The illustrated curves are isolux curves (i.e. curves corresponding to regions of the light beam in which the luminance expressed in lux is the same). The isolux curves (illustrated but not numbered) at the center correspond to a higher luminance level than on the periphery. It may be seen that the imaged light beam pattern 30 produced has a horizontal cutoff (at 40), is essentially level with the horizontal axis. The horizontal cutoff may not be perfectly straight; it may have a curvature that corresponds to aberrations in the image produced. In any case, in absence of any trim shield, the horizontal cutoff (at 40) can can be produced by the lower edge of reflective surface 6-2 of the collector 6. It can also be seen that the produced beam can have a sharp outline corresponding to the front edge of the reflective surface 6-2 of collector 6 under the horizontal axis.

Now it is noteworthy to mention that proceeding FIGS. 4, 6, 9, 10 and 13 depict perspective representations of alternative light module arrangements that apply the trim shield 7 features as alternate embodiments of the present invention. The reference numbers of the preferred embodiment of the light module (illustrated in FIGS.-1A-3) are used to designate the same elements or corresponding elements. However, similar corresponding numbers can be used in the alternate embodiments. Reference is additionally made to the description of these elements in relation to FIGS. 4-14.

The alternative embodiments illustrated are similar to the preferred embodiment and differ from the preferred embodiment essentially in that the applied collector 6, 6-1, 6-2, trim shield 7 and lens 10 or reflector 110 can vary by shape, size, orientation, focal point location 6-3, 10-3, the trim shield's edge 7 or beam cutoff features 9, 20-1, 20-2 may also vary as applied against the reflective collector surface 6-2.

Figure 4:
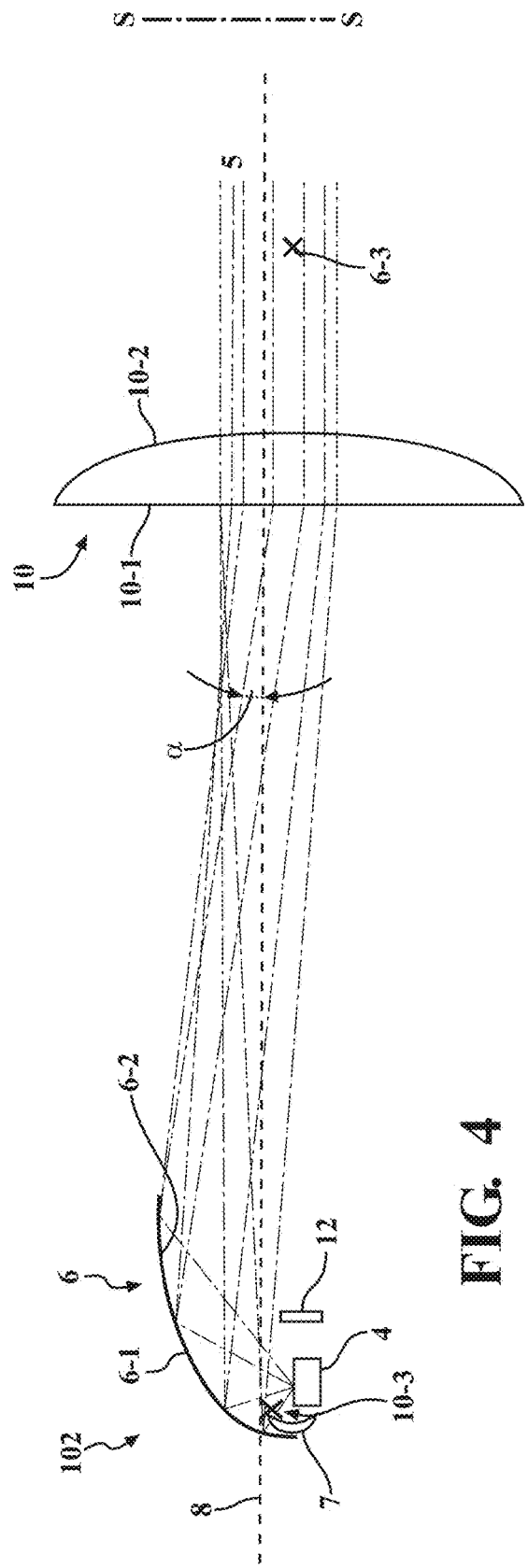
FIG. 4 is a principal view representation of a light module trim shield arrangement of the present invention in an alternate embodiment.

An alternative embodiment (light module 102) in FIG. 4 is depicted similar to the first presented embodiment and differs essentially in that the trim shield 7 has a kink or more generally is obscuring light rays emitted from light source 4 from the reflective surface 6-2 of collector 6 by extending upward into collector 6. In other words, the beam cutoff features 9, 20-1, 20-2 contemplate and can incorporate not only a kink but can also be closer to the optical axis 8. This is due to the desired beam geometry where maximum intensity can be at the level of the optical axis 8. In other configurations or combinations of the trim shield 7 with given collectors, it is possible for the beam cutoff features not to be closer to the optical axis 8 or trim shield 7 coinciding with a focal point 10-3. The rest is essentially identical to the preferred embodiment of the light module 2.

FIG. 4 is a schematic representation of the light module and of its operating principle, similar to FIG. 2. Similar to the previously introduced embodiment, optical projecting systems other than the projection lens 10 are envisageable, such as in particular one or more mirrors, as in FIGS. 6, 9 and 10. It may be seen that the collector 6 is shorter. That is to say, the collector 6 extends less toward the light source 4.

FIGS. 6, 9, 12 and 15 illustrate light devices for a motor vehicle according to several embodiments. FIGS. 6, 9, 10 and 13 are perspective views of the light devices. The light devices 14, 114, 314 include a plurality of light modules in accordance with the invention that when combined can form a light beam of dipped or low-beam type, having a kinked horizontal cutoff.

Figure 5:
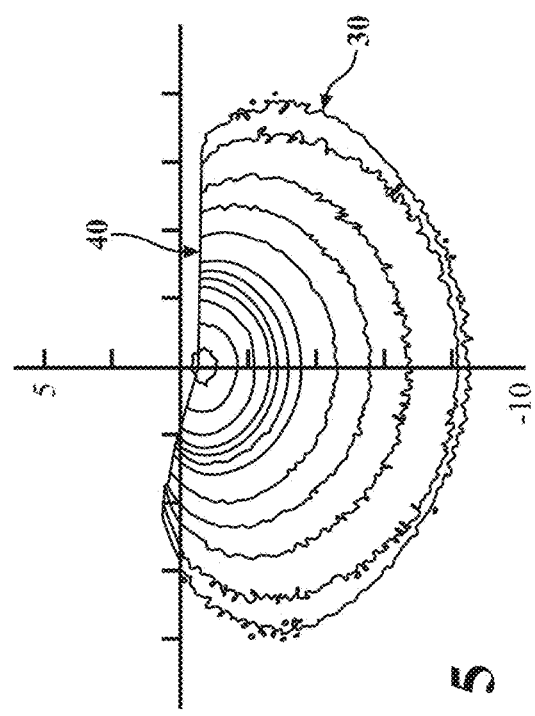
FIG. 5 is a graphical representation of the resulting beam image with the applied cutoff features of the lighting device of FIG. 4.

More specifically, the light devices 14, 114, 314 can include a light module 102, 302-1 in accordance with that of FIGS. 4 and 5. That is to say, an optical module with a kinked horizontal cutoff. Such a function is commonly referred to using the term "kink". The light devices 14, 114, 314 can also include multiple light modules 2, 302-2 arranged side-by-side and in accordance with the light modules of FIGS. 2 and 3. That is to say, a light module with a flat horizontal cutoff. Such a function is commonly referenced as using the term "flat".

Figure 6:
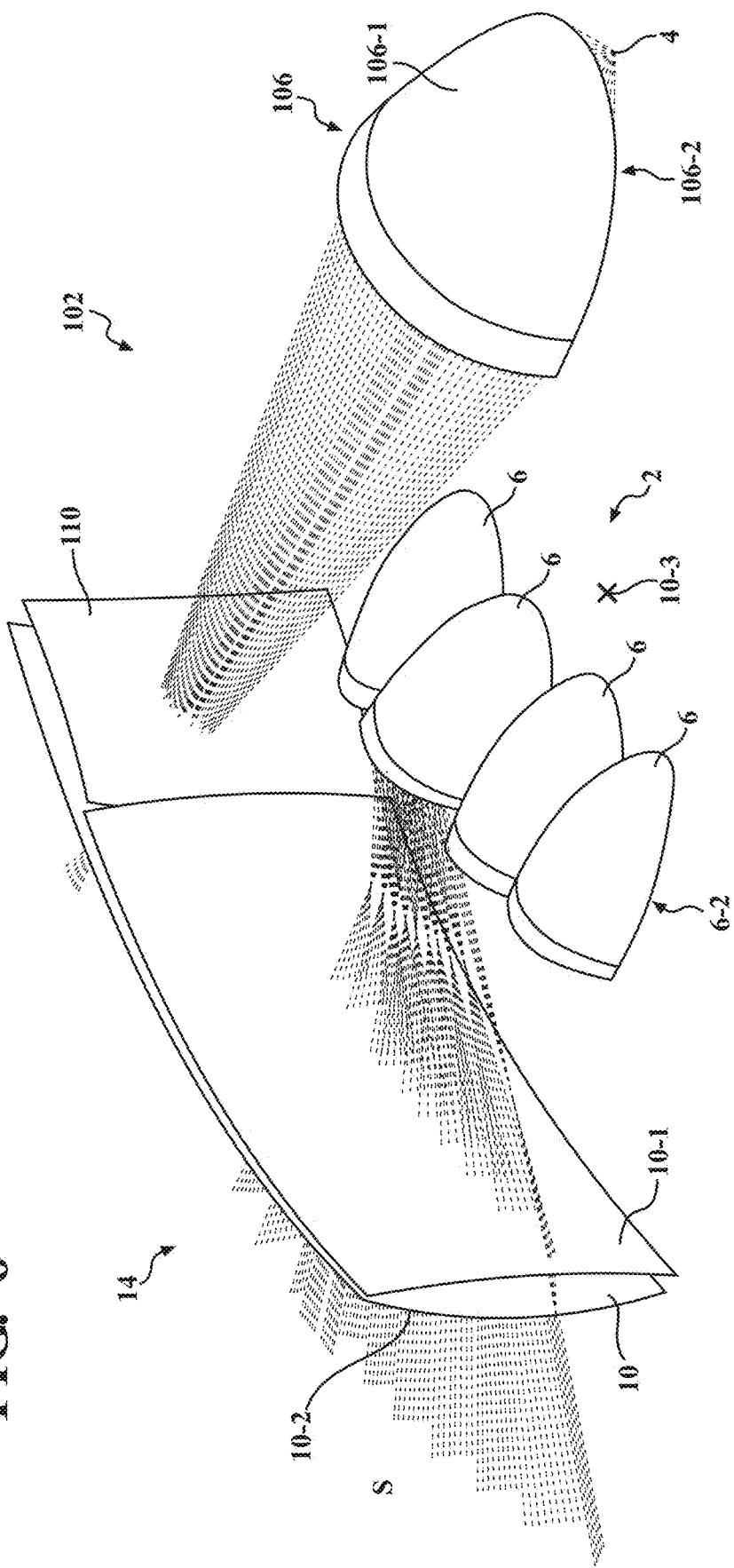
FIG. 6 is a perspective view of an alternative light module arrangement that applies the noted trim shield features, with associated collectors and various projection lenses as an alternate embodiment of the present invention.
Figure 7:
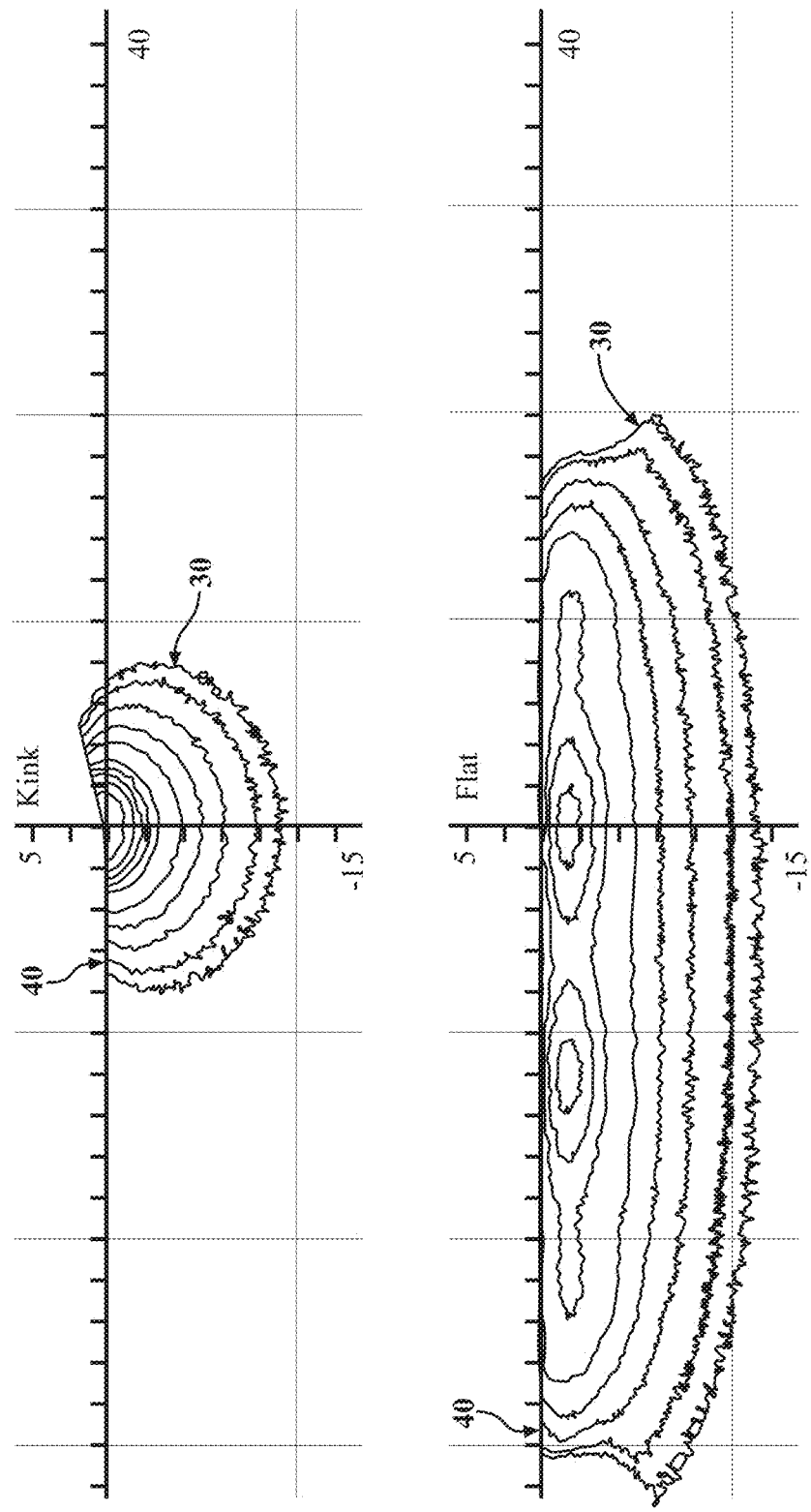
FIG. 7 is a graphical representation of each contributive kink and flat image produced by the applied cutoff features from the light module arrangement of FIG. 6.
Figure 8:
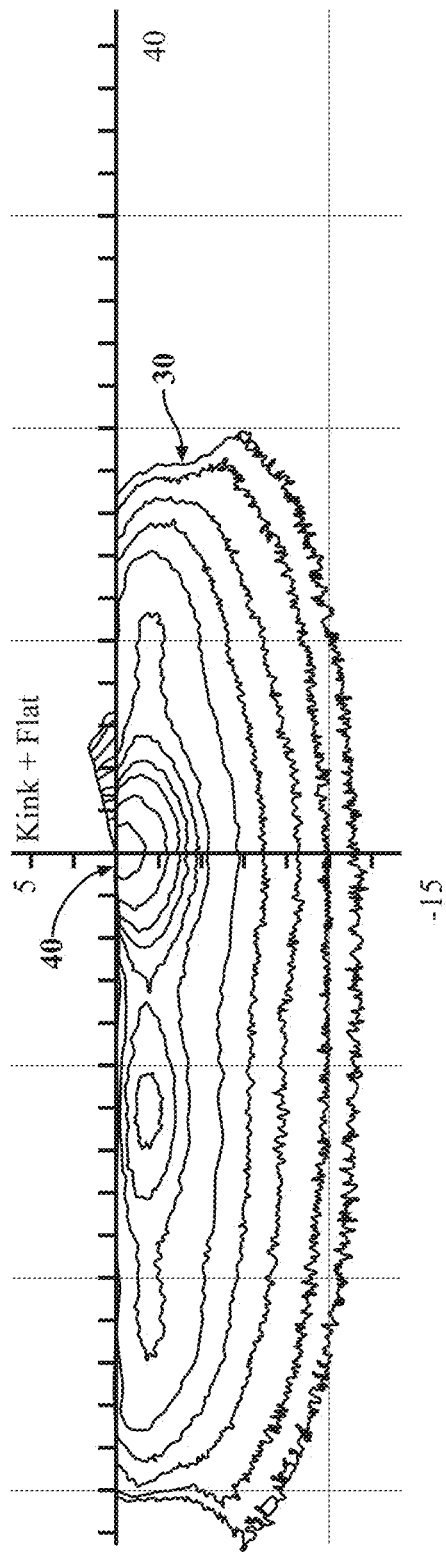
FIG. 8 is a graphical representation of the resulting beam image of the lighting device of FIG. 6.

FIG. 6 is a perspective view of an arrangement of light modules 2, 102 with collectors 6, 106 that can result in graphical representations FIG. 7 of kink and flat beam pattern 30 with cutoffs 40 and the resulting beam pattern 30 with cutoff 40 that combines each kink and each flat cutoff module to produce the overall image of FIG. 8. FIG. 7 can represent each respective contributed beam pattern 30 produced by each kink and each flat cutoff module of the illustrated arrangement.

However for FIG. 6, these light modules 2 have the particular feature that their projection lenses form a common lens 10 in one piece. The common lens 10 has a generally curved horizontal profile and entrance 10-1 and exit 10-2 faces. It has a focal point line 10-3, which is advantageously located behind the collectors 6 so as to essentially image the applied trim shield 7 edge features with sourced light 4 against the reflective surfaces 6-2 and thus produce a sharp horizontal ("flat") cutoff. Each lit emission applied with beam cutoff features 9, 20-1, 20-2 against reflective surface 6-2 of the collector 6 are thus imaged essentially vertically but less horizontally in order to achieve horizontally diffuse illumination and thus ensure good homogeneity between the images of the light modules 2.

Projection lens 110 of the light module 102 of FIG. 6 is advantageously distinct from the common lens 10. The focal point 10-3 of the lens 10 is itself located in front of the trim shield 7 edge features in proximity to the reflective surface 106-2 of the collector 106, so as to image said surface not only vertically but also horizontally and thus produce a sharp "kinked" cutoff. A partition (described but not shown) may be provided between the light module 102 and the light module 2 closest to said module 102, so as to allow them to be brought closer together without the light rays 5 escaping from one of the modules and interfering with the other. Such a partition can extend essentially vertically when the lighting device is in the mounted position as illustrated in FIG. 6. The partition can be advantageously opaque or light absorbent.

FIG. 7 represents the light intensity off the reflective surface 6-2 applied with trim shield 7 along the optical axis 8 or along a cutoff effect 40 from trim shield 7, similar to FIG. 5. The kink from application of the trim shield 7 cutoff features can be clearly seen in the projected beam pattern 30. FIG. 8 is a graphical representation of overlaid beam patterns 30 projected by the light module of FIG. 6, similar to FIG. 5. The beam cutoff effect 40 along a horizontal reference from trim shield 7 can be seen corresponding from cutoff features 9, 20-1, 20-2 designed into trim shield 7, which can result in FIGS. 7 and 8. FIG. 7 illustrates the light beam pattern 30 produced by the light module 102 (FIG. 6; "kink") and the light modules 2 (FIG. 6; "flat"). The upper light beam pattern 30 is produced by the light module 102. It is very sharp and corresponds to the cutoff effect 40 in FIG. 5. The lower beam pattern 30 is produced by two of the four optical light modules 2 (FIG. 6), namely those for which light ray 5 pathways are shown in FIG. 6.

A sharp cutoff effect 40 along a horizontal reference and a homogeneous horizontal mixing of contributing light images of the two modules 2, 102 can be clearly seen in FIG. 7. It should be noted that the cutoff effect 40 along a horizontal is particularly flat with respect to that which is visible in FIG. 3 embodiment of the light module 2, since the reflective surfaces of the collectors 6 have trim shield 7 beam cutoff features from upper lateral edge features 9, 20-1, 20-2 that are further away from the light sources 4, respectively. Similar to the light modules of FIGS. 4 and 5, the beam cutoff feature 9 edge and upper lateral edges 20-1, 20-2 then control the beam pattern 30 in one and the same plane.

FIG. 8 illustrates the combined light images of each beam pattern 30 associated with the "kink" and "flat" of FIG. 7. It is understood that the multiple light modules 2 whose light ray 5 pathways are not shown in FIG. 6 would complete the light image on the right-hand side, similar to the image in FIG. 7 of the two light modules whose light ray 5 pathways are shown.

Figure 9:
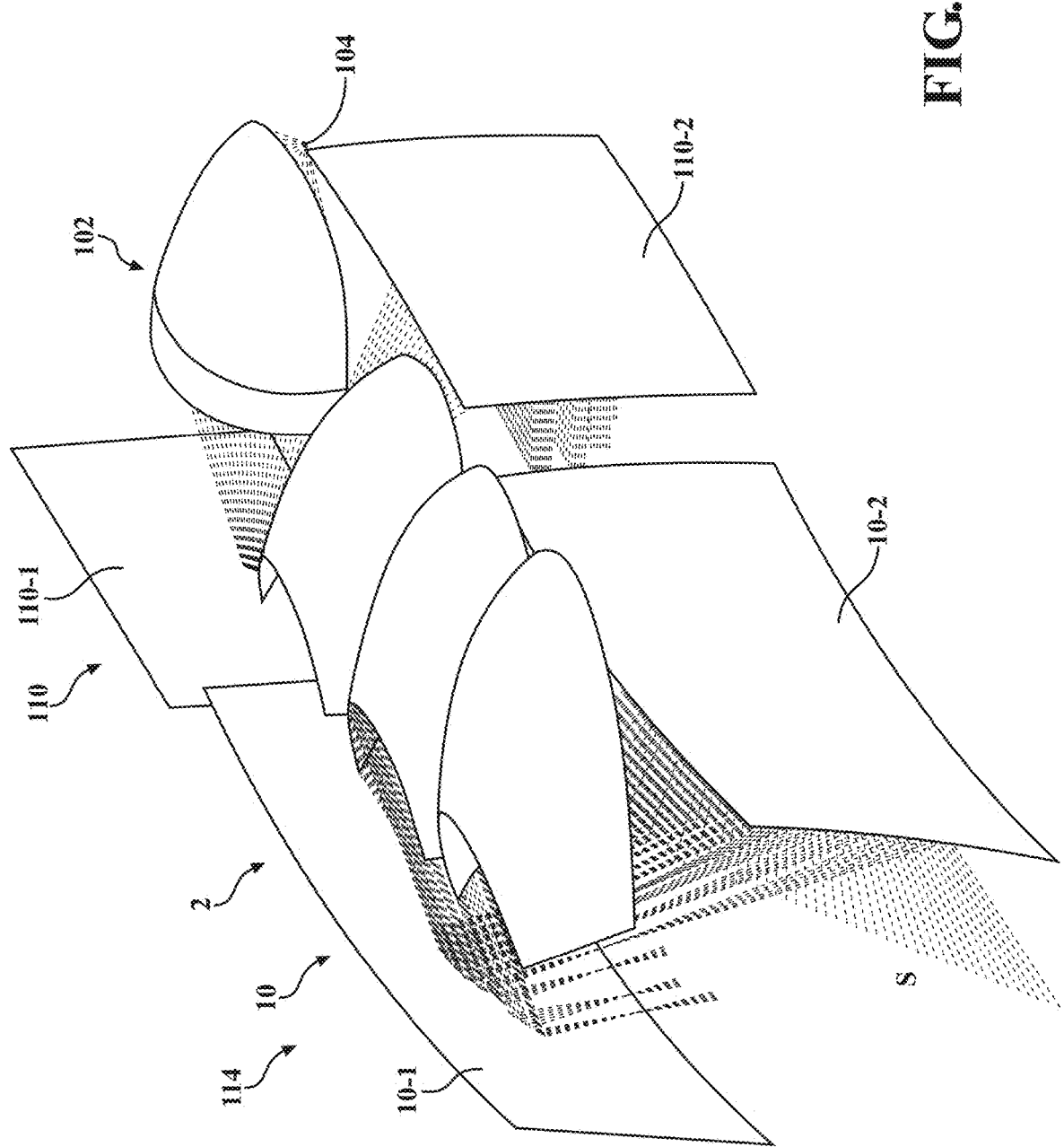
FIG. 9 is a perspective representation of a lighting device that includes light modules according to another embodiment of the invention.
Figure 10:
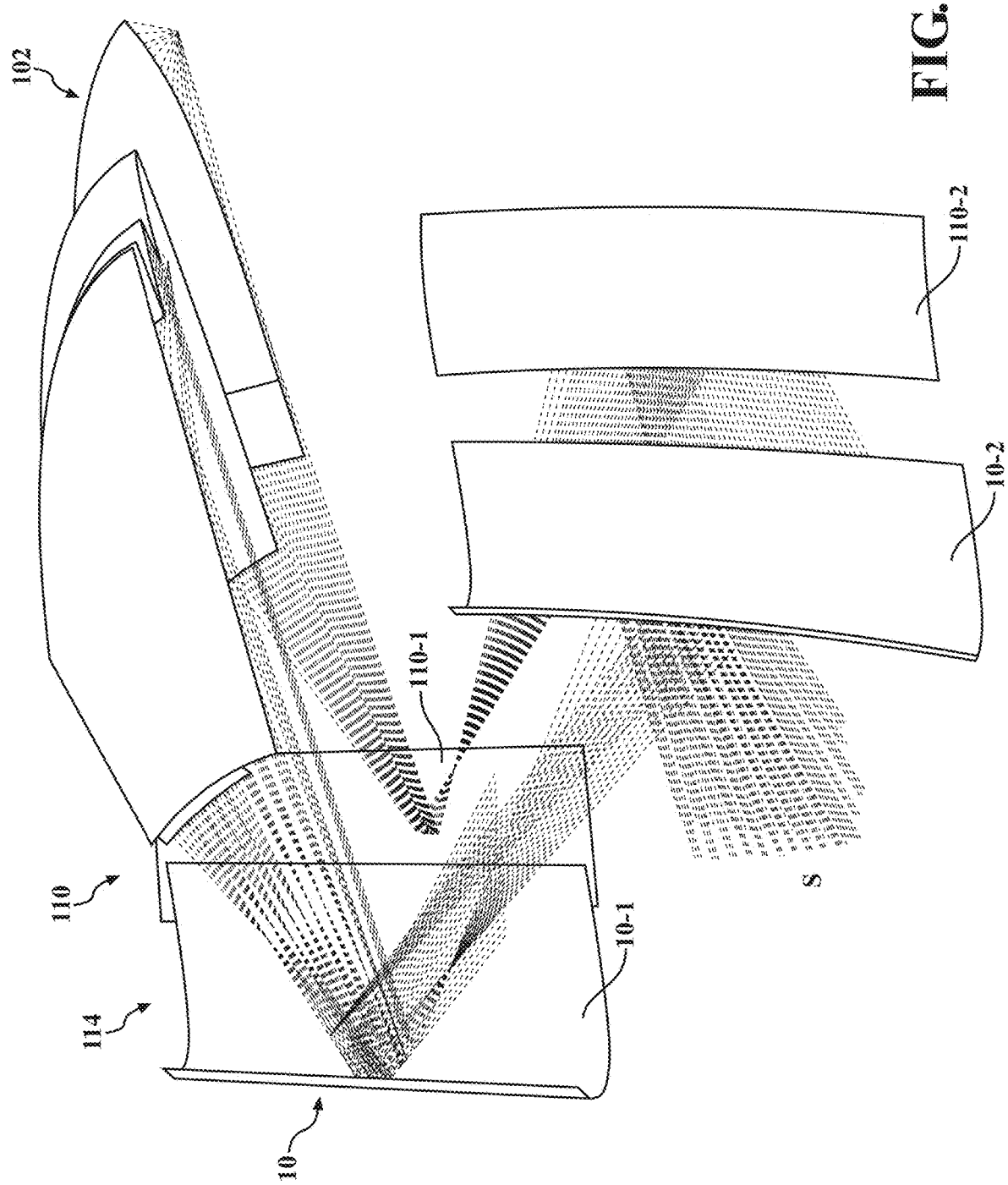
FIG. 10 is a perspective representation of an alternative light module arrangement that applies the trim shield feature as another alternate embodiment of the present invention.

FIGS. 9-14 illustrate light devices for a motor vehicle according to alternate embodiments. FIGS. 9 and 10 are two perspective views of a light device. Similar to the light device of the preliminary presented embodiment, the light device 114 includes a first light module 102 in accordance with that of FIGS. 4 to 5, that is to say a module with a kinked cutoff effect 40. The light device 114 also includes three light modules 2 arranged side-by-side and in accordance with the light module of FIGS. 2 to 3—that is to say a module with a flat cutoff effect 40 along a horizontal direction. The light device 114 is distinguished from the light device 14 of FIG. 6 essentially in that the projection lenses 10, 110 of the light modules 2 and 102 are replaced with mirrors.

More specifically, both FIG. 9 and FIG. 10 modules 102 include an optical projecting system 110 including a first mirror 110-1 and a second mirror 110-2. The first mirror 110-1 may be planar or have a concave curved horizontal profile. It sends the illustrated light rays 5 emitted off the collector 6 of the light module 102 to a second mirror 110-2. This is configured to form an image of the lit reflective surface of the light module 102 trimmed by trim shield 7. For this purpose, the second mirror 110-2 may have a concave parabolic vertical profile. Such a profile allows enlarged imaging of the lit reflective surface of the collector of the light module 102 trimmed by trim shield 7. The second mirror 110-2 may have a convex horizontal profile, in particular when the first mirror 110-1 has a concave horizontal profile.

The first and second mirrors 110-1, 110-2 can also be reversed with their functional roles after having just been described. In such a reversed described scenario, the light device would be more bulky due to the fact that the first imaging mirror would prospectively need to be shifted (in particular, longitudinally) further forward. Similar to the light module 102, the light modules 2 of FIGS. 9 and 10 include an optical projecting system 10 provided with a first mirror 10-1 and a second mirror 10-2. The operating principle would be identical to that of the previously described optical system 110. The observations presented above therefore also apply to the optical system 10.

FIG. 9 is a rear perspective view of the collectors 6, 106 of the light module 102, similar to FIGS. 2, 4 and 6. FIG. 9 can represent each respective contributed beam pattern 30 produced by each kink and each flat cutoff effect 40.

Figure 11:
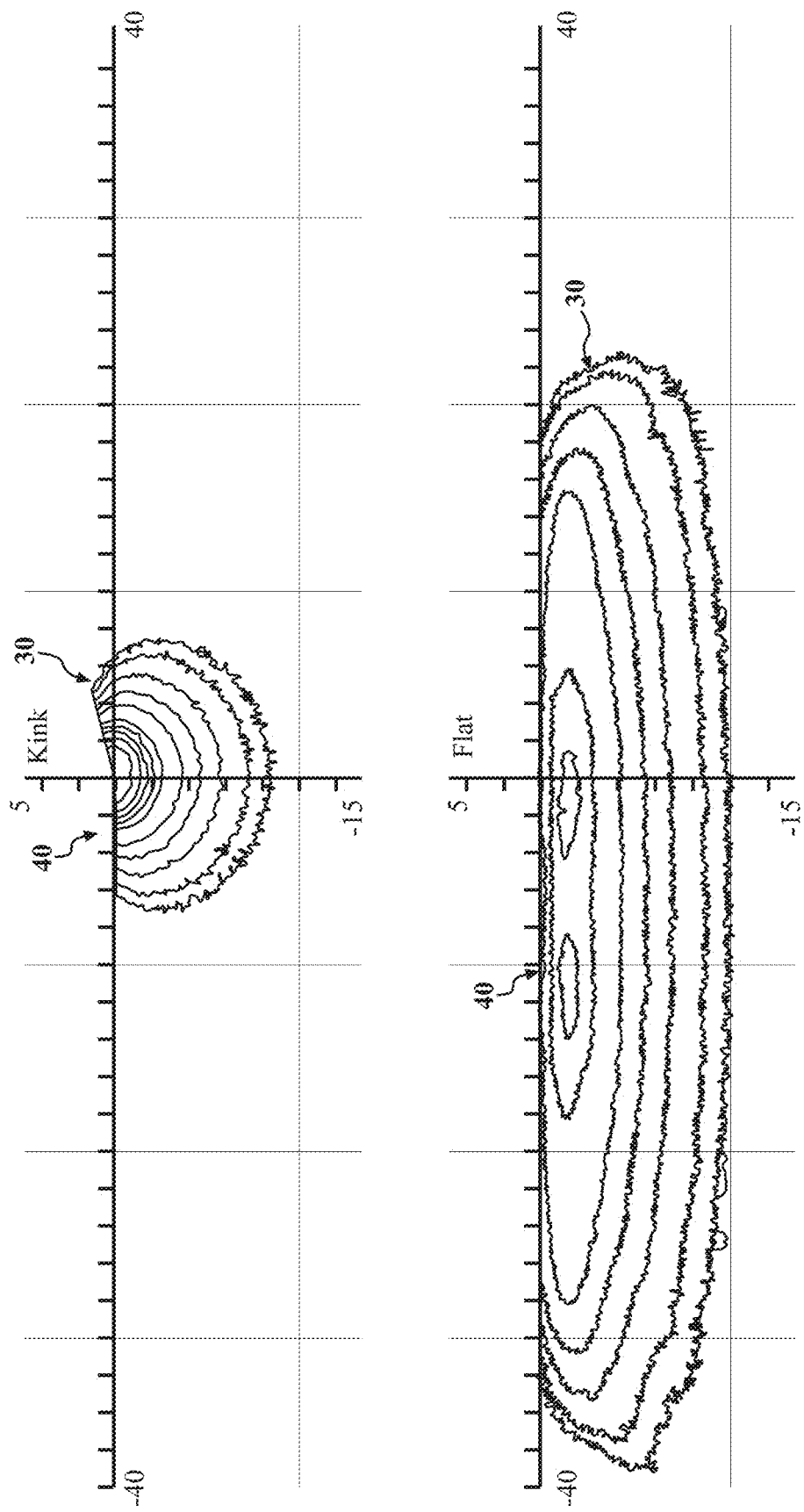
FIG. 11 is a graphical representation of each contributive kink and flat image produced by the applied cutoff features by the light modules of FIG. 9 or FIG. 10.
Figure 12:
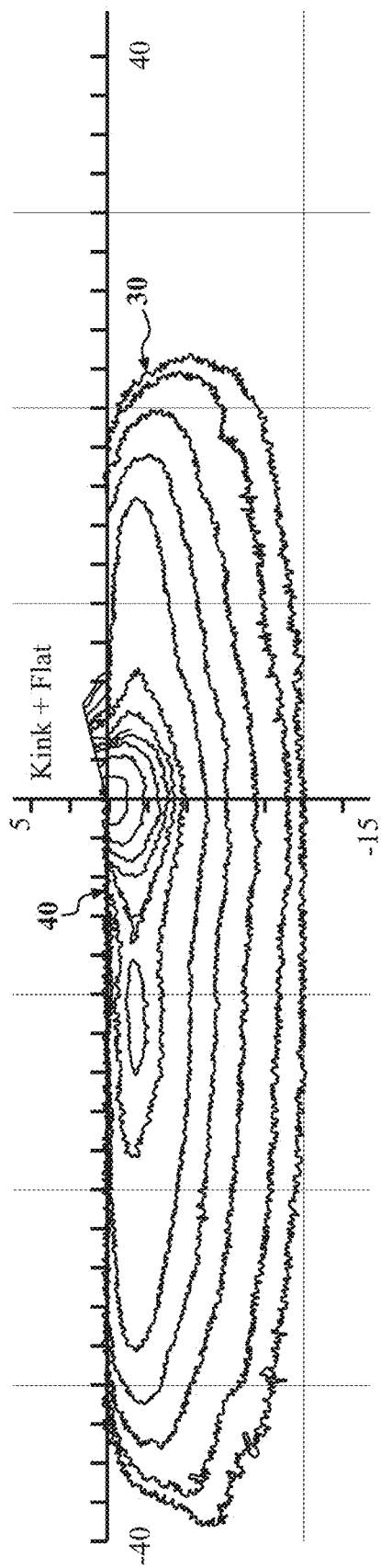
FIG. 12 is a graphical representation of the resulting beam image of the lighting device of FIG. 9 or FIG. 10.

FIG. 9 is an alternate embodiment arrangement of a light module 2, 102 that can result in a graphical representation of the resulting projected beam pattern 30 that combines each kink and each flat cutoff effect 40 of FIG. 11 to produce the resultant shaped beam pattern 30 of FIG. 12. This alternate embodiment differs from the prior embodiments essentially in that the collector 6 of light module 2 is truncated laterally. That is to say, the alternate embodiment illustrates only a portion form of a shell such as in the earlier presented embodiments. The architecture of the module 102 and its operating principle is similar to that of the previously introduced embodiments.

FIG. 11 illustrates a representation of the light intensity applied onto the reflective surface 6-2 as shaped by trim shield 7 features and seen along the optical axis 8 onto a projection surface S, similar to FIGS. 3, 5, 8. It is possible to see the sharp edges corresponding from the shaping features of cutoff 9 or upper lateral edges 20-1 and 20-2 and from the trim shield 7 features. FIG. 12 is a graphical representation of the beam pattern 30 projected by the light device 114 of the alternative embodiment, correspondingly similar to FIGS. 5, 8. The observations made in relation to FIG. 12 of a previous embodiment of the lighting device similar to FIG. 6. FIG. 12 illustrates the combined light patterns 30 of the "kink" and "flat" images from FIG. 11. The observations made of the previously introduced embodiments in relation to FIGS. 2 and 4 of the lighting device similarly apply to FIG. 13.

Figure 14:
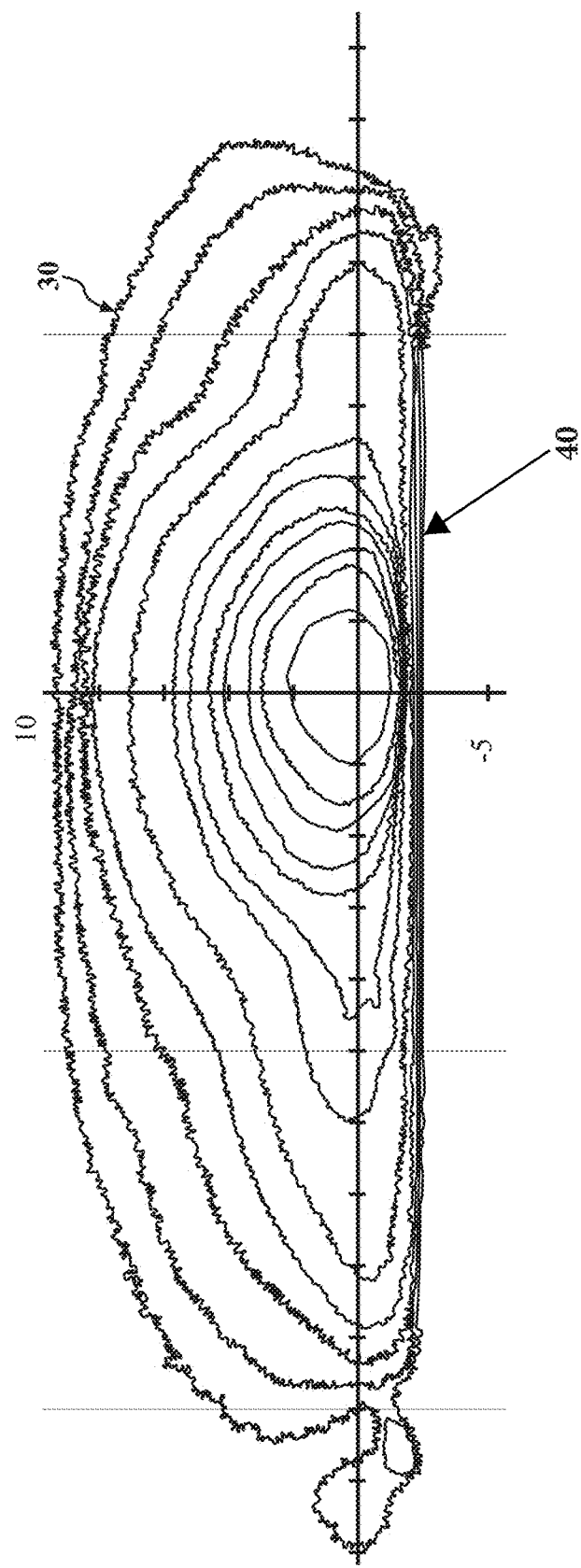
FIG. 14 is a graphical representation of the resulting beam image of the lighting device of FIG. 13.

FIG. 14 is a representation of the light intensity of the reflective surface 6-2 as shaped by trim shield 7 features as seen along the trim shield or near optical axis 8 onto a projection surface S, correspondingly similar to FIGS. 3, 5, 8 and 11. It is possible to see the sharp edge features corresponding to cutoff effects 40 from cutoff feature 9 or the edges with respect to the light source of upper lateral edge 20-1 and upper lateral edge 20-2 of the trim shield 7 features.

In general, it is advantageous to note that for the different embodiments of the light modules and light devices, different optical projection systems are envisioned as long as they are able to image the lit reflective surfaces of each associated collector 6 trimmed by trim shield 7 in question. In the case of a set of mirrors 10-1, 10-2, 110-1, 110-2 as described above with reference to FIGS. 9-12, the first mirror 10-1, 110-1 or the second mirror 10-2, 110-2 can be made unitized or in one-piece with the associated collector, which can be advantageous in terms of enhancing precise control between the relative positioning of these elements.

Figure 13:
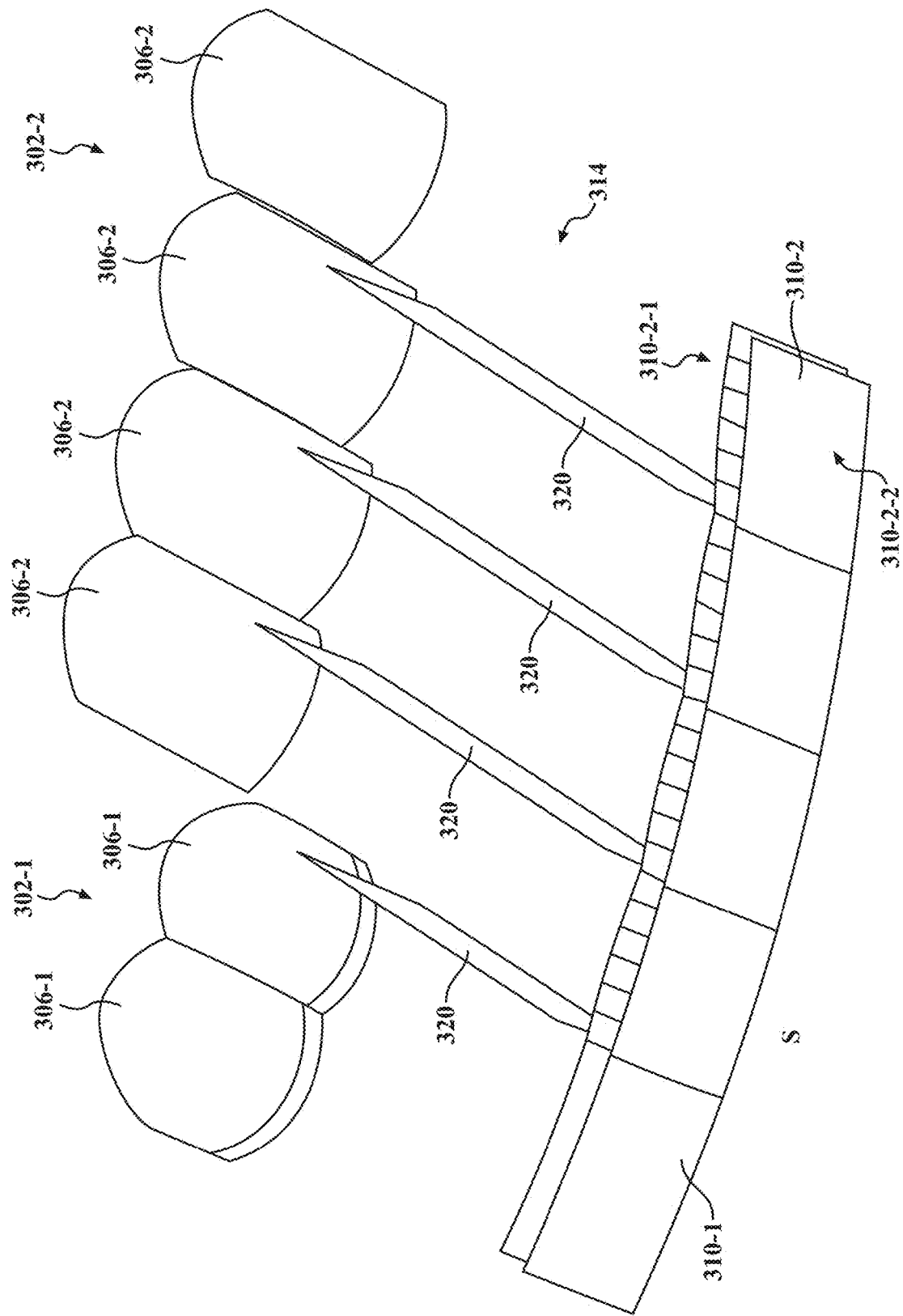
FIG. 13 is a perspective representation of an alternative light module arrangement that applies the trim shield features with associated collectors, lateral surface dividers and a unitized projection lens as an alternate embodiment of the present invention.

FIG. 13 illustrates a light device 314 for a motor vehicle according to an alternate embodiment. FIG. 13 is a front perspective view from above the light device 314. The light device 314 includes a plurality of light modules 302-1, 302-2 in accordance with the invention, which when combined, form a high-beam type lighting beam. More specifically, the light device 314 includes a first set 302-1 of two light modules 306-1 similar to that of FIGS. 2-5. That is to say, a module with a flat horizontal or shaped beam cutoff through a cutoff effect 40 from a trim shield 7 or its beam cutoff feature 9, upper lateral edge 20-1, or upper lateral edge 20-2. However, the associated vertical orientation can be reversed with respect to those of the previously introduced embodiment since most of the light from a beam pattern 30 of high-beam type is above the horizontal. The collectors 306-1 with any possible associated trim shield 7 features therefore have their cavity oriented upward according to the viewing angle of FIG. 13. The light sources 4 are withheld from illustration and not shown for the sake of simplicity. The function of this first set is to achieve the horizontal or widthwise spreading of the high beam. The light modules of 302-1 have a common projection lens 310-1.

The light device 314 also includes a second set 302-2 with four light modules 306-2 arranged side-by-side, which when combined, can also form a high-beam type beam pattern 30 and similar to the light module of FIGS. 2 to 5. That is to say, a module with a flat horizontal or shaped beam cutoff effect 40, again rotated 180° vertically. The collectors 306-2 with associated trim shields 7 and cutoff features therefore have their cavity oriented upward according to the viewing angle of FIG. 13. The function of this second set 302-2 is to produce the frontal range of the high beam, that is to say the central region which has the maximum intensity. However, these light modules of 302-2 have the particular feature that their projection lenses form a common lens 310-2, in one piece. The common lens 310-2 can have a generally curved horizontal profile and entrance 310-2-1 and exit 310-2-2 faces. The illustrated entrance face 310-2-1 would exhibit structuring features in order to improve the homogeneity of the light beam pattern 30.

A partition 320 may be provided between the light module 302-1 and the light module 302-2 closest to said module 302-1, so as to allow them to be brought closer together without the light rays 5 escaping from one of the modules to interfere with the other module. Such a partition 320 extends essentially vertically when the lighting device 314 is in the mounted position as illustrated. Partitions 320 can be designed advantageously to be opaque or light absorbent to incorporate differing values of light absorbency. FIG. 14 illustrates the combined light image of images from the collectors 302-1 and 302-2 of FIG. 13, when all of light sources are activated "on." A high-beam distribution would be easily recognized in this resultant shaped beam pattern 30 with cutoff effect 40.

Furthermore, although the light modules of the invention have been described here so as to form light devices for producing lighting beams such as a low beam, high beam or segmented high beam of linear-array type with parallel vertical strips, it goes without saying that these modules can be designed so as to perform signaling functions such as direction indicator, daytime running light, or position light, which will have the aesthetic advantage of having a light device containing a plurality of modules that are aesthetically similar when they are off and capable of performing a multitude or even all of the regulatory motor vehicle lighting and signaling functions at the front of a motor vehicle. It is thus possible to associate a first light device producing a low beam and another producing a potentially segmented, high beam within one and the same motor vehicle headlamp.

Moreover, it is advantageous to note the numerous advantages of the light modules and of the light devices according to the invention. Namely to essentially note the fact of imaging the lit reflective surface of the collector with applied trim shield, under Gaussian conditions, makes it possible to obtain a sharp light image, and hence, to produce cutoffs of various and varied shapes by trimming the corresponding beam edges of a resultant corresponding beam projection.

Another noteworthy advantage can result from the fact that Gaussian conditions are present so as to obtain a minimum level of sharpness-namely that the collector is limited in size, in particular in height, such as for example less than 30 mm. Yet another noteworthy advantage can result from the fact that as Gaussian conditions are present, allows a resulting beam projection of an applied trim shield onto a reflective collector to be produced in a single plastic injection without shrinkmark problems namely that the projection lens may advantageously be a thin lens, for example of less than 6 mm.

And with the incorporation of the invention with adoption of the thin lens, the other advantages of requiring a shorter injection cycle time, of leading to a decrease in the weight of the optical light modules, and of generating little or no chromatic aberration are also incorporated. Thus, allowing the use of ordinary-quality synthetic polymer materials which are inexpensive with respect to materials of high optical quality which generate few chromatic defects.

Lastly, incorporation of the invention with a thin lens renders it possible to envisage one particular embodiment in which the shell of a collector and the projection lens are made by injection molding a single part-thus reducing to practice to form a bridge of material connecting the front end of the collector and projection lens.

And unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

Accordingly, any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements, ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. The claimed expression "a number of . . . " is to be construed to mean or represent "one or more" in countable number such that the expression can represent a singular or multiple number of recited unit elements.

Light Source 4

The light source 4 can represent a source of electromagnetic radiation or an energized source of visually perceived radiant energy (inclusive of "Visible" light of the electromagnetic spectrum) but may include a broad range or combination of electromagnetic or radiant energy inclusive of X-rays, ultraviolet and infrared energy, micro-wave and radio wave spectrums. The light source may include every conventional and suitable lighting element sources such as filament-based or incandescent lamps, fluorescent lamps, arc or gas-discharge type lights, light emitting diodes (LED), or other suitable conventional sources.

Reflective Collector 6, 106, 306-1, 306-2

The reflective collector functions as a light-gathering or light-directing structure. A collector can be made as a solid dioptric part, made of synthetic polymer or polymer compound such as polycarbonate, polymethyl methacrylate (PMMA), of resin, resin compound, glass or of silicone in numerous formed shapes such as cap-like, parabolic, egg-shaped, elliptical formed surfaces (and not limited by examples) which can be metallized in order to create a reflective surface 6-2 according to the invention. A solid dioptric part can include an entrance face and an exit face for light rays 5 emitted by a light source and include a reflection face.

The reflective collectors can all be located within a housing and function to redirect the light in a predetermined pattern. The collectors may direct light between an upper housing and a lower housing. The collectors may direct light through a lens. The collectors may all direct light where the light may combine to form a predetermined pattern. The collectors may each provide light to a predetermined region to form part of a pattern, part of a function, or both. One collector may be located adjacent to one light source 4. The collector may be a plurality of reflective surfaces 6-2. The associated light system may include two or more, three or more, four or more, six or more, eight or more, ten or more, twelve or more, or even fourteen or more collectors. The light system can include 50 or less, 40 or less, 30 or less, 20 or less, or 15 or less collectors. The associated light system may include collectors 6 that include static reflectors and movable reflectors.

Trim Shield 7

Trim shield 7 is a structural element that functions to block, overshadow, absorb, clip or cut away parts of an emitted light or beam emission from being projected onto a reflective surface in order to shape or reformulate the bounds of a resultant light beam or shaped beam pattern 30 with cutoff effect 40. Trim shield 7 is not limited to any particular material and can be formed from an assortment of metallic, ceramic, polymeric or any suitably available conventional materials that facilitate the function.

Trim shield 7 may be affixed in position by any manufacturing assembly method including attachment directly to collector 6, light source 4, or an intermediate component such as an electronic circuit board or heat sink.

Beam Cutoff Feature 9

Beam cutoff feature 9 functions as a structural feature of trim shield 7 to alter portions of a projected beam and can re-shape a sourced beam image. Beam cutoff feature 9 extends from trim shield 7 in the form of an edge or protuberance or impression that has the effect of altering or refining the shape of a projected beam so as to trim-away or clip the shape of emitted light towards an altered beam or a tailored design such as to conform with regulatory lighting standards for safety purposes or provide a particular lighted image appearance, by non-limiting examples.

Projection Lens 10

Lens 10 functions as a piece of glass, transparent material or other light-transmissive body with curved sides for concentrating or dispersing light rays, used singly (as in a magnifying glass) or with other lenses (as in a telescope). The lens 10 can include material additive features, optical features at portions of its body or throughout its body or at various locations along its body to effect the light transmission characteristics through the lenses structure. The projection lens 10 can alternatively extend to a light transmissive medium, which functions as the material body that a wave (inclusive of electromagnetic particle or light waves) passes through. For example, light waves traveling through or passing-through a "medium" material. The light transmissive medium can be constructed from or be formed together as a unitized, integral or as a combination body resulting from constituent components. The light transmissive medium material can include rigid bodies or a material body of varying flexibility or of a simple geometric or customized shape or a material body of relative elasticity or a gel-rubberized material and may include various colorant or additive features that can interfere with light transmission at various levels yet still allow for light transmission through the "medium" body at various levels.

Projection Surface S

Projection surface S functions to represent a target area region where emitted light rays 5 or a shaped beam pattern 30 with cutoff effect 40 are directed from an associated optical module. The target area region can represent a proximate or distant target area or may even be directed toward a horizon line focal point onto no particular surface obstruction. A projection surface can represent a smooth, rough planar, complex curvilinear surface, any mass obstruction or space area directed toward a great expanse beyond an associated optical module or associated lighting system.

Surface Partition 320

Surface Partition 320 functions as a structural element that separates areas between lighted sections to segregate or isolate against undesirable light bleed between adjoining optical sections. Partitions 320 can be designed advantageously to be opaque or light absorbent to incorporate differing values of light absorbency. Such surface partitions can be applied to complement or absorb reflected light between adjoined sections or is a surface side feature that is aligned parallel with a light emission axis such that light is effectively nullified from reflection along to the optical axis.

Light Beam 30

The Light beam pattern 30 functions as the light emission 5 derived from a compilation of light sources 4 before any applied beam shaping alteration. The light beam pattern 30 can be derived from the output of an individual module or a light beam pattern from multiple modules or as an arrangement-series of flat faces or geometric beam forms. Beam cutoff effect 40 functions as the resulting projection from an overlay of trim shield 7 with beam cutoff features 9, upper lateral edge 20-1 or upper lateral edge 20-2 onto light beam 30. The beam cutoff effect 40 can be derived from the output of an individual module or multiple modules coinciding with each contributive kink and flat beam from the incorporated light modules in the associated light system.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

It should be appreciated that the above referenced aspects and examples are non-limiting, as others exist within the present invention as shown and described herein.

LIST OF ELEMENT NUMBERS

Optical light module 2, 102, 302-1, 302-2
Light source 4
Light emission rays 5
Reflective Collector 6, 106, 306-1, 306-2

Reflective Surface Profile 6-1
Reflective Face 6-2
Reflector Focal point 6-3
Projection Lens Focal point 10-3
Trim Shield 7
Optical Axis 8
Beam Cutoff Feature 9
Projection Lens 10, 110, 310-1, 310-2
Light Input Side 10-1, 110-1, 310-1-1, 310-2-1
Light Output Side 10-2, 110-2, 310-1-2, 310-2-2
Projection Surface S
First projection Mirror 10-1, 110-1
Second projection Mirror 10-2, 110-2
Screen or Light Blocker 12
Light device 14, 114, 314
Lateral Surface Partition 320
Upper Lateral Edge 20-1, 20-2
Beam pattern 30
Beam cutoff effect 40

The invention claimed is:

1. A light module of an automobile comprising:
a light source configured to generates light rays;
a trim shield having at least a beam cutoff feature that shapes a number of the light rays to produce a beam pattern, with the trim shield located between the light source and a collector, wherein the beam cutoff feature is an extension off of the trim shield that extends a profile section beyond a lateral edge and from a surface of the trim shield facing the light source; and
the collector with a reflective surface profile configured to redirect the beam pattern in a direction along an optical axis of the light module.

2. The light module of claim 1, wherein the beam cutoff feature of the trim shield produces a cutoff effect onto the beam pattern that propagates to a projection surface [S].

3. The light module of claim 1, further including a projection lens wherein the collector is configured to redirect the beam pattern in the direction along the optical axis towards a projection lens.

4. The light module of claim 1, further including
a projection lens with a light input side and a light output side that receives a portion of the number of light rays from the collector after light traverses the trim shield and a light blocker.

5. The light module of claim 1, wherein the collector has an elliptical or ellipsoid form surface impression.

6. The light module of claim 1, wherein the collector has a parabolic form surface impression.

7. The light module of claim 2, wherein the beam cutoff feature is an impression or a protuberance formed from within the trim shield.

8. The light module of claim 7, wherein an extension forms a profile edge configured to interfere with light from the light source and reshape the beam pattern from an alteration through the beam cutoff feature.

9. The light module of claim 8, wherein the impression or the protuberance is configured to interfere with light from the light source and reshape the beam pattern with a cutoff effect through the beam cutoff feature.

10. The light module of claim 1, wherein the trim shield further includes a first lateral edge and a second lateral edge applied with beam cutoff feature.

11. The light module of claim 4, wherein the projection lens is a thin lens and formed integral as one-piece with at least one collector associated with the light module.

12. The light module of claim 4, wherein the projection lens is a light transmissive medium or an imaging mirror within the light module.

13. The light module of claim 1, wherein the collector encompasses the light source by a half-space shell.

14. The light module of claim 1, wherein a profile of the trim shield includes a structure of a number of adjoining surfaces that are curvilinear, free-form, segmented, revolved, swept, asymmetric or some combination thereof.

15. The light module of claim 1, where a partition is provided between the light module and an adjacent light module;
the partition being light absorbent so as to prevent light rays from escaping from each light module and interfering with each beam between the light module and the adjacent light module.

16. The light module of claim 1, wherein the trim shield is formed from a polycarbonate (PC), polyetherimide (PEI), metallic or other polymeric material.

17. The light module of claim 1, wherein the number of light rays from the light source are configured to be located along the trim shield before the number of light rays arrive at the collector.

18. A beam shaping light module of an automotive product comprising:
a light source configured to generate a beam pattern;
a trim shield located between the light source and a collector, the collector having a reflective surface profile configured to redirect light in a direction along an optical axis of the light module;
wherein the trim shield has a cutoff feature that shapes the beam pattern emitted by the light source, wherein the cutoff feature is an extension off of a surface from the trim shield that faces the light source, the extension forming a perimeter impression between a first lateral edge and second lateral edge of the trim shield;
the cutoff feature configured to reshape the beam pattern with a cutoff effect; and
the cutoff effect extended to a projection lens having a light input side and a light output side resulting in a cutoff beam pattern onto a projection surface [S].

19. A light module of an automobile comprising:
a light source configured to generate light rays;
a trim shield having at least a beam cutoff feature that shapes a number of the light rays to produce a beam pattern, with the trim shield located between the light source and a collector; and the collector with a reflective surface profile configured to redirect the beam pattern in a direction along an optical axis of the light module, where a partition is provided between the light module and an adjacent light module;
the partition being light absorbent so as to prevent light rays from escaping from each light module and interfering with each beam between the light module and the adjacent light module.

* * * * *